July 26, 1932.  R. C. DAVIS  1,869,051
TIRE PRESSURE RELIEF VALVE
Filed June 14, 1929
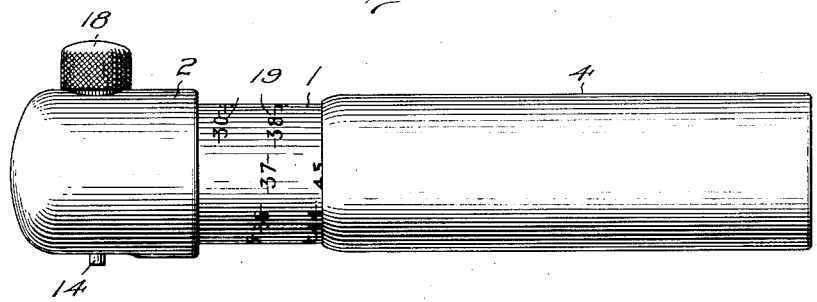
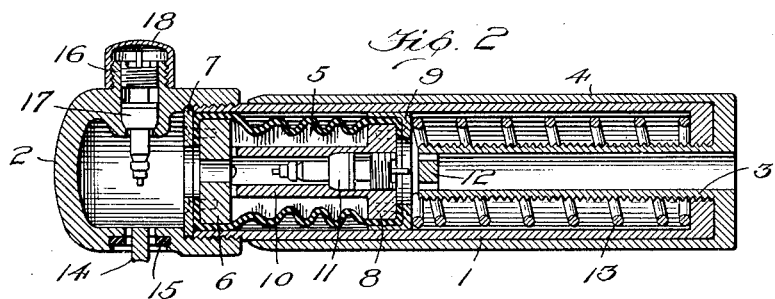
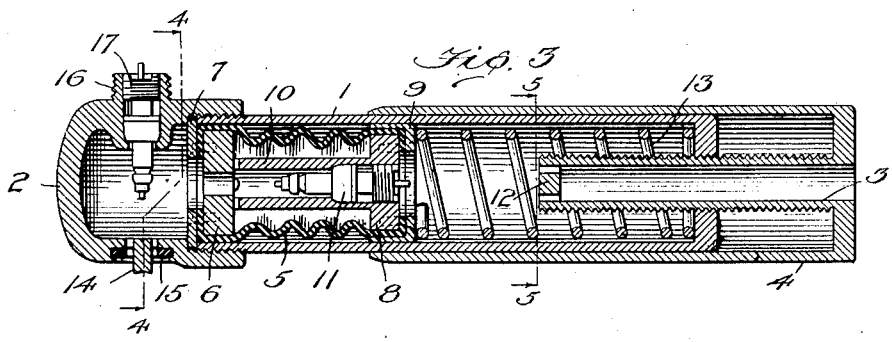
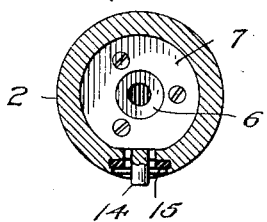
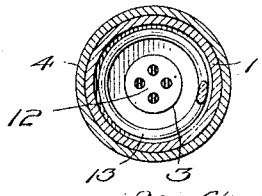
Inventor
Roy Chandler Davis
Witness
Edwin L. Bradford
By
his Attorney Patented July 26, 1932

1,869,051

UNITED STATES PATENT OFFICE

ROY CHANDLER DAVIS, OF GLOUCESTER, MASSACHUSETTS

TIRE PRESSURE RELIEF VALVE

Application filed June 14, 1929. Serial No. 370,787.

My invention relates to tire pressure relief valves, and more particularly to a gauge of the blow-off type adapted for use in filling or testing pneumatic vehicle tires.

An object of my present invention is to provide an instrument of the character indicated which is adapted to be interposed in series between a pressure line and a pneumatic tire or other container to be filled with fluid under pressure and which can be set to blow off at any predetermined pressure, within certain limits, and thus prevent over-inflation.

Another object is to provide an instrument which is adapted to be applied to the valve nipple of an inner tube for vehicle tires or like fluid pressure container to indicate the pressure of fluid in the tire or other container, and which may be manipulated to release fluid to lower the pressure to a desired value.

A further object is to provide a safety valve or gauge including an air bag adapted to receive air under pressure and provided with means for liberating a portion of the contained air when a predetermined selected pressure has been attained.

A still further object is to provide a pressure gauge including a loose fitting plunger adapted to be displaced by fluid under pressure contained in a distensible bag associated with the plunger.

Another object is to provide an instrument of the class indicated which shall be durable, accurate and of inexpensive construction.

Other and further objects and advantages of the present invention will be apparent from the description hereinafter of the invention in one form of embodiment.

In the accompanying drawing which forms part of this application for Letters Patent, and in which like reference characters indicate the same parts in the several views, Figure 1 is a side elevation of a pressure relief valve constructed according to the principles of my invention;

Fig. 2 is a vertical longitudinal section of the device showing the setting barrel in its closed position;

Fig. 3 is a similar section of the device showing the outer or setting barrel unscrewed to a predetermined setting;

Fig. 4 is a transverse section taken on the line 4—4 of Fig. 3; and

Fig. 5 is a similar section taken on the line 5—5 of Fig. 3.

Referring to the drawing, 1 indicates a cylindrical barrel provided with external screw threads at one end which engage internal screw threads of an inlet head 2, and having at its opposite end an integral cap centrally perforated and screw threaded to engage a relatively long hollow screw 3 of an outer setting barrel 4. Through the medium of the hollow screw and cap, barrels 1 and 4 are associated in adjustable, telescoping relation, while head 2 is screwed down tightly on barrel 1.

Fixed in the first mentioned end of barrel 1, and extending in a normally collapsed condition toward the opposite end thereof, is an air bag 5. Though not necessarily constructed of an elastic material, I have shown this air bag formed of rubber, cylindrical in form when distended, but configured with accordion-like folds when in the collapsed condition illustrated in the drawings. The bag is preferably formed of a material which is non-permeable, or nearly so, to the fluid with which the gauge is to be used. The material at the outer end of the bag is turned radially inward and clamped between a plug 6 and a clamping disk 7 by means of small screws or the like passing through the disk and the bag material and threaded into the plug. The disk is securely held between the end of the barrel 1 and an inner flange in the head 2. Plug 6 and disk 7 are each provided with a central, registering perforation.

It will be apparent from the foregoing description, taken in connection with the disclosure of Figs. 2 and 3, that the interior of head 2 is thus placed in direct communication with the interior of air bag 5.

Referring further to Figs. 2 and 3, it will be apparent that the inner end of bag 5 is turned radially inward over the edge of a plunger 8 and hermetically secured thereto by means of a flanged or cupped clamping disk 9 and small machine screws in the same manner as has been explained in connection with the opposite end of bag 5. Plunger 8 is provided with an internally threaded central perforation, and unlike plug 6 is free to move axially of barrel 1. The function of the flange or cup provided about the periphery of clamping disk 9 is to offset and snugly embrace that portion of the bag material which is received over the edge of head 8 to prevent binding of the bag material against the inner wall of barrel 1 as plunger 8 is reciprocated therein. A tube 10, integral with plunger 8, surrounds the circumference of the perforation in plunger 8 and extends in the direction of plug 6.

A valve 11 is screw threaded into plunger 8 and extends into tube 10, as shown. This valve may be of any well known type, such as the Schrader or Dill valve, provided it is capable of normally preventing flow of fluid in one direction and is provided with a stem, depression of which permits fluid to flow through the valve. The stem of valve 11 extends in the direction of hollow screw 3, which arrangement normally prevents escape through the valve of any fluid which may be contained in bag 5.

The inner end of hollow screw 3 is guarded by a perforated plug 12 having a solid, imperforate center portion. A coil spring 13, normally under slight compression, is disposed between clamping disk 9 and the hollow screw receiving end of barrel 1, to urge plunger 8 in the direction of head 2 and normally maintain the parts in the position shown in Figs. 2 and 3, that is, with the free end of tube 10 abutting against plug 6.

Head 2 is closed at its outer end and provided, intermediate its end portions, with two apertures, preferably diametrically opposed. In one of these apertures is positioned a spider carrying a projecting pin or tongue 14 surrounded by a rubber gasket or like packing 15. Surrounding the opposite aperture is a short nipple 16 carrying a valve 17 which may be similar to valve 11. The stem of valve 17 extends outwardly from head 2 so as to prevent escape of air or other fluid out of the head through nipple 16, but permit ingress of fluid through valve 17 upon application of external pressure to its stem. Nipple 16 is externally screw threaded, and a cap 18 may be provided to close the nipple when the valve is not in use.

Suitable graduations 19 are spirally stepped around the outer surface of barrel 1 for the purpose of indicating the setting of the pressure to be regulated by the device above described, in a manner which will now be explained.

As hereinabove stated, the instrument which forms the subject of this application for Letters Patent is capable of two principal uses, first: to limit the amount of air being pumped into a tire, for example; and second: to indicate the pressure of the air in a previously inflated tire and blow off all air constituting a pressure in excess of that desired.

When used for the first purpose stated above, the device operates as follows:

Outer barrel 4 is first turned relatively to barrel 1 until the highest graduation 19 uncovered by its inner end corresponds to the pressure to which it is desired to inflate the tire, as for example 45 pounds per square inch, as shown in Fig. 1. This results in retracting the plug 12 from its position of close proximity to the stem of valve 11, as shown in Fig. 2, to a point of greater distance therefrom, though still in the same axial alignment, as shown in Fig. 3. The aperture in head 2 containing tongue 14 is then pressed down over the usual valve nipple which projects from the vehicle tire inner tube (not shown) and, cap 18 having been removed from nipple 16, the end coupling of the pressure hose (not shown) is pressed down over this nipple. It will be apparent that air from the pressure hose will at once flow into the interior of head 2 and thence into the tire through its valve, the stem of which is being depressed by tongue 14. Air will also flow through the apertures in plate 7 and plug 6, and, the stem of valve 11 being seated, the incoming air will proceed to build up a pressure in air bag 5, which is held against radial distention by the barrel 1. When the pressure of the air on plunger 8 overcomes the counter pressure of spring 13, the plunger will be displaced against the tension of the spring and move toward plug 12. It will be apparent that when this displacement has proceeded to a degree sufficient to cause the stem of valve 11 to contact with plug 12, any further movement of plunger 8 will result in opening valve 11 to permit the escape of any additional air which may be introduced and prevent the building up of an excess pressure in the system.

In other words, assuming that the graduated indicia 19 have been accurately placed on barrel 1, when the setting barrel has been positioned as shown in Fig. 3, an air pressure of exactly 45 pounds per square inch will be required to cause the stem of valve 11 to contact with plug 12, and air producing any pressure in excess of 45 pounds per square inch will be blown off by the opening of valve 11. Escape of the excess air is effected through the perforations in plug 12 and through the bore of hollow screw 3. The escaping air as it issues through valve 11 produces a characteristic hissing sound, and in addition may be felt by the hand of the operator when placed over the end of barrel 4. The pressure indicated by the highest exposed graduation 19 having thus been attained, the instrument is removed from the tire valve nipple. The customary tire valve then prevents escape of the air in the tire, and the operation is complete.

When used for the second purpose stated above, that is, as a testing gauge to indicate the pressure contained in a previously inflated tire, and to blow off, if necessary, air constituting a pressure in excess of that desired, the device operates as follows:

Outer barrel 4 is unscrewed to uncover any graduation 19 which is higher than the estimated pressure in the tire. The aperture containing tongue 14 is then pressed down on the tire valve nipple, thereby depressing the tire valve stem and releasing air from the tire into the head 2 and air bag 5, and displacing plunger 8 against the tension of spring 13 to an extent depending on the pressure of the air in the tire. Barrel 4 is then screwed in, and it will be apparent that when plug 12 contacts with the stem of valve 11, air from the tire will be released. The highest graduation 19 uncovered by the outer barrel 4 when air begins to escape through valve 11 will then indicate the pressure in the tire. If this pressure is in excess of that desired, outer barrel 4 is screwed further down until the highest uncovered graduation corresponds to the desired pressure. Air will then continue to blow off until the pressure drops to the point indicated, when further retraction of plunger 8, by reason of the dropping pressure, will cause the stem of valve 11 to seat and prevent further escape of air. The final pressure in the tire will then be that indicated by the highest exposed graduation 19.

It should be understood that while I have explained the construction and operation of the device in connection with the filling of vehicle inner tubes with air, such operation constitutes but one typical use for a gauge constructed according to the principles of the present invention. Gauges so constructed may be used to determine the pressure of any fluid, whether liquid or gaseous, in any container, whether valved or unvalved, with which communication may be effected. The scope of the appended claims is therefore not to be limited by reference in the foregoing specification to a gauge constructed for use in connection with the gaseous contents of a vehicle inner tube, such reference being merely by way of exemplification and illustration.

It is also to be understood that I have shown and described my present invention in but one form of embodiment. Other and further modifications will readily suggest themselves to persons skilled in the art to which the invention relates, and all such modifications insofar as they embody the principles of the invention are to be deemed within the scope and purview of the appended claims.

Having thus described my invention, what I claim and desire to secure by Letters Patent is:

1. In a tire pressure relief valve, an inner barrel containing at its inner end a movable pressure responsive element provided with a blow-off valve and having at its outer end a fixed axial screw threaded opening, in combination with an outer barrel having a hollow axial screw engaged in the opening of the inner barrel, the inner end of the hollow screw having a portion adapted to actuate the blow-off valve, and pressure indicia provided on the outer surface of the inner barrel adapted to be uncovered by relative rotation of the barrels.

2. In a tire pressure relief valve, an inner barrel having graduated pressure indicia on its outer surface and containing at its inner end a movable pressure responsive element provided with a blow-off valve, and having at its outer end a fixed axial screw threaded opening, in combination with an outer barrel having a hollow axial screw threaded into the opening of the inner barrel and having an inner peripheral edge adapted to uncover certain of the indicia, the inner end of the screw having a portion adapted to actuate the blow-off valve.

3. In a tire pressure relief valve, an inner barrel containing at its inlet end a movable pressure responsive element provided with a blow-off valve and having at its outer end a fixed axial threaded opening, in combination with an outer barrel having a hollow axial screw threaded into the opening of the inner barrel, the inner end of the screw having a portion adapted to actuate the blow-off valve, a wall of the outer barrel being provided with a perforation adapted to permit air released from the blow-off valve to escape from the gauge.

4. A tire pressure relief valve as claimed in claim 3 including an air bag disposed in the inner barrel between the inlet end and the pressure responsive element, and a compression spring disposed in said barrel between the outer end of the barrel and the free end of the air bag.

In testimony whereof I affix my signature.
ROY CHANDLER DAVIS.